(12) United States Patent
Seo et al.

(10) Patent No.: US 12,157,265 B2
(45) Date of Patent: Dec. 3, 2024

(54) COUPLER FOR AIR SUSPENSION AND APPARATUS AND METHOD FOR MANUFACTURING THE SAME

(71) Applicant: HYUNDAI MOBIS CO., LTD., Seoul (KR)

(72) Inventors: Kang Won Seo, Yongin-si (KR); Chang Ho Cho, Yongin-si (KR); Jong Hoon Kim, Daegu (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/321,317

(22) Filed: May 22, 2023

(65) Prior Publication Data

US 2023/0286207 A1   Sep. 14, 2023

Related U.S. Application Data

(62) Division of application No. 17/487,392, filed on Sep. 28, 2021, now Pat. No. 11,787,102.

(30) Foreign Application Priority Data

Sep. 28, 2020   (KR) .......................... 10-2020-0126060

(51) Int. Cl.
*B29C 53/00* (2006.01)
*B29C 53/58* (2006.01)
(Continued)

(52) U.S. Cl.
CPC .......... *B29C 53/581* (2013.01); *B29C 53/583* (2013.01); *B29C 53/845* (2013.01); *B29C 63/0069* (2013.01); *B29C 65/7841* (2013.01)

(58) Field of Classification Search
CPC ......... B29C 53/04; B29C 53/22; B29C 53/30; B29C 53/581; B29C 53/582; B29C 33/50;
(Continued)

(56) References Cited

U.S. PATENT DOCUMENTS 950,263 A     2/1910   Harpster
1,324,850 A *  12/1919  Roberts .................. B29C 53/22
                                                        156/251
(Continued)

FOREIGN PATENT DOCUMENTS

DE   10 2004 061 989 A1   7/2006
EP         2 053 268 A1    4/2009
JP         2013-95334 A    5/2013

OTHER PUBLICATIONS

German Office Action issued on Jun. 2, 2023, in counterpart German Patent Application No. 10 2021 124 848.5 (4 pages in English, 5 pages in German).

(Continued)

*Primary Examiner* — Thu Khanh T. Nguyen
(74) *Attorney, Agent, or Firm* — NSIP Law

(57) ABSTRACT

A method of manufacturing a coupler for an air suspension includes: preparing a topping cord sheet and a rubber band; connecting the topping cord sheet and the rubber band to each other by attaching the rubber band to an outer circumferential surface of the topping cord sheet; and vulcanizing an intermediately formed body made by the connecting of the topping cord sheet and the rubber band to each other.

8 Claims, 10 Drawing Sheets

(51) Int. Cl.
*B29C 53/84* (2006.01)
*B29C 63/00* (2006.01)
*B29C 65/78* (2006.01)

(58) Field of Classification Search
CPC ....... B29C 33/505; B29C 35/02; B29C 43/14; B29C 43/20; B29C 43/203; B29C 43/26
See application file for complete search history.

(56) References Cited

U.S. PATENT DOCUMENTS

| | | | | |
|---|---|---|---|---|
| 4,708,758 | A * | 11/1987 | McGregor | B32B 15/06 384/129 |
| 8,938,868 | B2 * | 1/2015 | Kim | B29C 53/58 29/895.211 |
| 2004/0081542 | A1 | 4/2004 | Nolasco et al. | |
| 2006/0125146 | A1 * | 6/2006 | Sandstrom | B29C 33/505 425/43 |
| 2012/0041130 | A1 | 2/2012 | Ye | |
| 2014/0103585 | A1 * | 4/2014 | Coxon | B29C 70/446 425/389 |
| 2015/0031809 | A1 | 1/2015 | Yamamoto | |
| 2018/0056738 | A1 | 3/2018 | Towner | |

OTHER PUBLICATIONS

Chinese Office Action issued on Apr. 27, 2023, in counterpart Chinese Patent Application No. 202111120752.8 (14 pages in English, 10 pages in Chinese).

* cited by examiner

COUPLER FOR AIR SUSPENSION AND APPARATUS AND METHOD FOR MANUFACTURING THE SAME

CROSS-REFERENCE TO RELATED APPLICATIONS

This application is a divisional of U.S. Pat. No. 11,787, 102, filed on Sep. 28, 2021, which claims the benefit under 35 U.S.C. § 119 (a) of Korean Patent Application No. 10-2020-0126060 filed on Sep. 28, 2020 in the Korean Intellectual Property Office, the entire disclosures of both of these being incorporated herein by reference for all purposes.

TECHNICAL FIELD

The present disclosure relates to a coupler for an air suspension and an apparatus and method for manufacturing the same, and more particularly, to a coupler for an air suspension and an apparatus and method for manufacturing the same, which are capable of improving quality and durability and reducing a defect rate.

BACKGROUND ART

An air suspension refers to a suspension system that supports a load of a vehicle body by using an air spring using resiliency of compressed air.

The air spring of the air suspension may be implemented by a bellows, an internal volume and pressure of which are changed as the bellows is extended or contracted in a vertical direction. A coupler for an air suspension may be used to fix an end of the bellows to a subject (e.g., a cover).

The coupler for an air suspension has a hollow cylindrical shape that enables the coupler to perform a cardan (bending) motion. One end of the bellows may be coupled to one end of the coupler, and the other end of the coupler may be coupled to the subject.

Meanwhile, the coupler for an air suspension may have a hollow cylindrical shape with a ring-shaped protrusion (a ring-shaped protrusion for locking a fixing ring) disposed on an outer circumferential surface thereof. The coupler may be made by processes of making a composite sheet by stacking a topping cord sheet (a sheet made with a combination of cords and a rubber layer) and a rubber sheet, winding the composite sheet around an outer circumferential surface of a mandrel so that the composite sheet has a hollow cylindrical shape, and vulcanizing the composite sheet by apply heat and pressure to the composite sheet with the cylindrical shape.

More specifically, the ring-shaped protrusion of the coupler may be formed by deforming (deforming in a thermoplastic manner) a rubber sheet by applying heat and pressure to one part of an outer circumferential surface of the cylindrical composite sheet using a first mold and simultaneously by applying heat and pressure the other part of the outer circumferential surface of the composite sheet using a second mold that may be separated from the first mold.

However, in the related art, since the composite sheet is vulcanized by the first and second molds that are separated from each other, there is a problem in that a parting line, which corresponds to a boundary between the first and second molds, is formed on a surface of the finally formed coupler.

Further, to ensure cardan motion properties of the coupler, the cord of the topping cord sheet needs to be kept disposed in the topping cord sheet without being exposed to the outside.

However, there is a problem in the related art in that the cord of the topping cord sheet is pushed out or exposed directly to the outside by the parting line formed during the process of vulcanizing the composite sheet.

Therefore, recently, various studies have been conducted to improve quality and durability of the coupler for an air suspension and reduce a defect rate, but the study results are still insufficient. Accordingly, there is a need to develop a technology to improve quality and durability of the coupler for an air suspension and reduce a defect rate.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a method of manufacturing a coupler for an air suspension includes: preparing a topping cord sheet and a rubber band; connecting the topping cord sheet and the rubber band to each other by attaching the rubber band to an outer circumferential surface of the topping cord sheet; and vulcanizing an intermediately formed body made by the connecting of the topping cord sheet and the rubber band to each other.

The connecting of the topping cord sheet and the rubber band to each other may include: disposing the rubber band on an inner surface of a mold; disposing the topping cord sheet on the inner surface of the mold such that the topping cord sheet covers the rubber band; and pressing the topping cord sheet in a direction in which the outer circumferential surface of the topping cord sheet comes into close contact with an inner surface of the rubber band.

The pressing of the topping cord sheet in the direction in which the outer circumferential surface of the topping cord sheet comes into close contact with the inner surface of the rubber band may include using a bladder, which is expandable and contractible, to press an inner circumferential surface of the topping cord sheet.

The rubber band may be accommodated in an accommodation groove disposed in the inner surface of the mold, and the topping cord sheet may be pressed by the bladder in a state in which the topping cord sheet is disposed to cover the accommodation groove.

The vulcanizing of the intermediately formed body may include: disposing the intermediately formed body on an inner surface of a mold; pressing the intermediately formed body against the inner surface of the mold; and heating the intermediately formed body.

The pressing of the intermediately formed body against the inner surface of the mold may include using a bladder, which is expandable and contractible, to press an inner circumferential surface of the intermediately formed body.

The mold may have a single inner circumferential surface connected continuously.

In another general aspect, a coupler for an air suspension, manufactured by the method according to claim 1.

In another general aspect, an apparatus for manufacturing a coupler for an air suspension includes: a forming unit configured to connect a topping cord sheet and a rubber band to each other by attaching the rubber band to an outer circumferential surface of the topping cord sheet; and a vulcanization unit configured to vulcanize an intermediately formed body made by the connecting of the topping cord sheet and the rubber band to each other.

The forming unit may include: a mold having an inner surface on which the rubber band and the topping cord sheet are disposed; and a pressing part configured to press the topping cord sheet in a direction in which the outer circumferential surface of the topping cord sheet comes into close contact with an inner surface of the rubber band.

The pressing part may include a bladder configured to be expandable and contractible, and to press an inner circumferential surface of the topping cord sheet.

An accommodation groove may be disposed in the inner surface of the mold and may accommodate the rubber band. The bladder may press the inner circumferential surface of the topping cord sheet in a state in which the topping cord sheet is disposed to cover the accommodation groove.

The vulcanization unit may include: a mold having an inner surface on which the intermediately formed body is disposed; a pressing part configured to press the intermediately formed body against the inner surface of the mold; and a heating part configured to heat the mold.

The pressing part may include a bladder configured to press an inner circumferential surface of the intermediately formed body.

The mold may have a single second inner circumferential surface connected continuously.

Other features and aspects will be apparent from the following detailed description, the drawings, and the claims.

DETAILED DESCRIPTION

Figure 1:
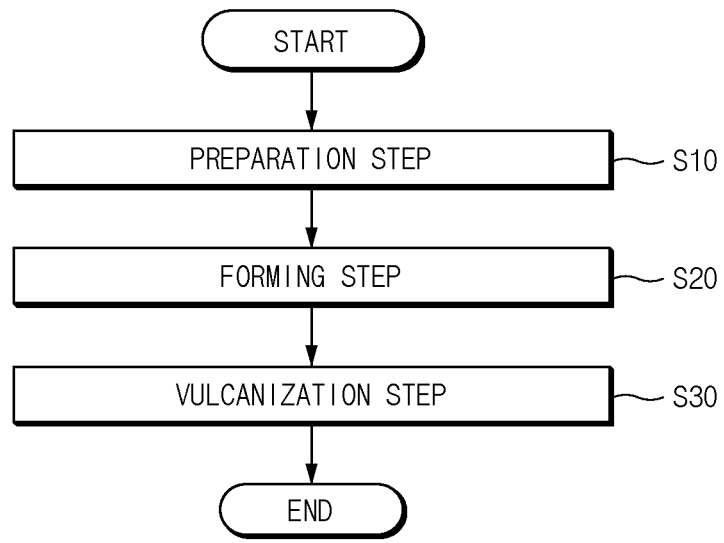
FIG. 1 is a flowchart for explaining a method of manufacturing a coupler for an air suspension according to an embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 10, an apparatus 10 for manufacturing a coupler for an air suspension according to an embodiment of the present disclosure includes a forming unit 100 configured to attach rubber bands 30 to an outer circumferential surface of a topping cord sheet 20, and a vulcanization unit 200 configured to vulcanize an intermediately formed body 40 made by connecting the topping cord sheet 20 and the rubber bands 30.

For reference, a coupler 40' for an air suspension, which is manufactured by the apparatus 10 for manufacturing the coupler for an air suspension according to the embodiment of the present disclosure, may be used to fix, to a subject (e.g., a cover), an end of a bellows (not illustrated) applied to an air suspension.

More specifically, the coupler 40' for an air suspension may include: a coupler main body 42' having a hollow cylindrical shape and configured to perform a cardan (elastic) motion; and ring-shaped protrusions 44' provided on an outer circumferential surface of the coupler main body 42'.

For example, in a state in which the coupler main body 42' surrounds the end of the bellows, a fixing ring (or a clamp, not illustrated) may be coupled to the outer circumferential surface of the coupler main body 42', the arrangement state of the coupler main body 42' and the bellows may be fixed by the fixing ring, and the arrangement state of the fixing ring may be locked by the ring-shaped protrusions 44'.

For example, the ring-shaped protrusions 44' may be respectively provided on the outer circumferential surfaces of one end, the other end, and a central portion of the coupler main body 42'. The present disclosure is not restricted or limited by the number of ring-shaped protrusions 44' and the arrangement interval between the ring-shaped protrusions 44'.

The forming unit 100 is configured to attach the rubber band 30 to the outer circumferential surface of the topping cord sheet 20.

Figure 4:
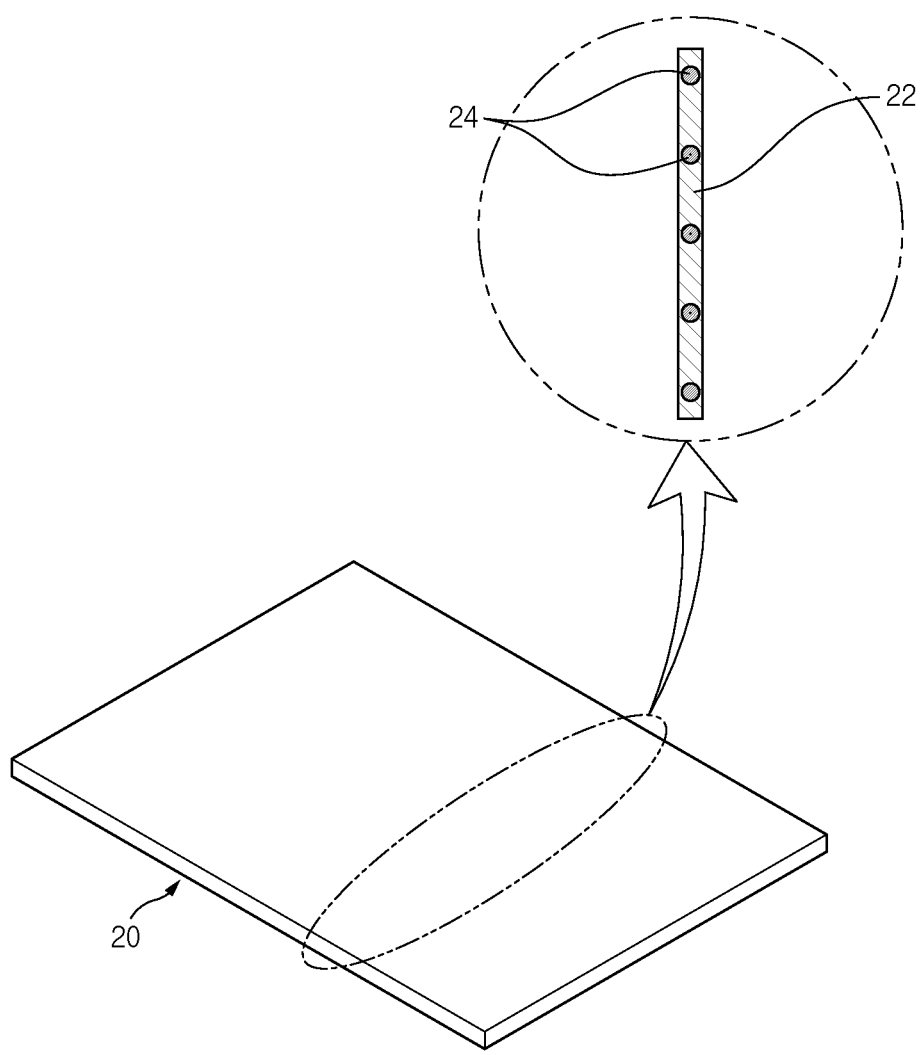
FIG. 4 is a view for explaining a topping cord sheet used for the coupler for an air suspension according to the embodiment of the present disclosure.

Referring to FIG. 4, the topping cord sheet 20 may include a cord 24, and a rubber layer 22 configured to surround the cord 24.

The cord 24 may be variously changed in type and properties in accordance with required conditions and design specifications. The present disclosure is not restricted or limited by the type and properties of the cord 24.

For example, a reinforcing material containing synthetic fibers such as rayon, nylon (polyamide), or polyester or other fibers may be used as the cord 24.

The rubber layer 22 is integrally topped (formed) on the cord 24 so as to surround the cord 24.

The rubber layer 22 may be variously changed in type and properties in accordance with required conditions and design specifications. The present disclosure is not restricted or limited by the type and properties of the rubber layer 22.

For example, the rubber layer 22 may be made of mixed rubber (e.g., carbon master batch (CMB) or final master batch (FMB)) made by mixing natural rubber or synthetic rubber with carbon, oil, a reinforcing agent, an active agent, or the like.

The topping cord sheet 20 may be provided by cutting a topping cord sheet roll (not illustrated) having a predefined length, width, and thickness into a predefined dimension (e.g., in the form of a rectangular sheet having a length greater than a width).

Figure 5:
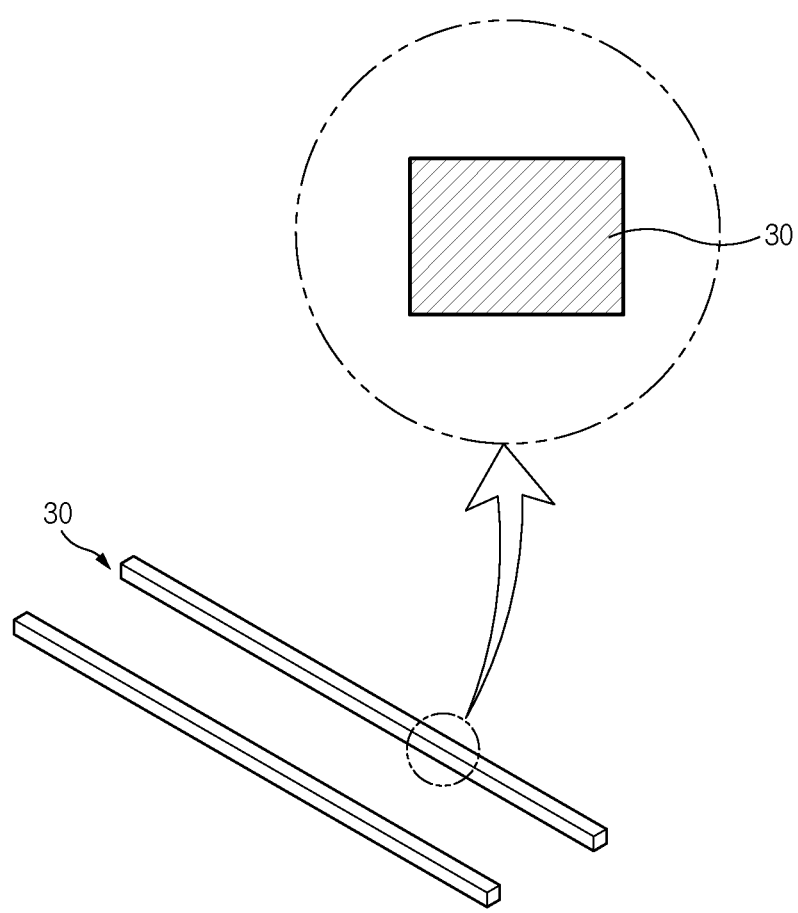
FIG. 5 is a view for explaining a rubber band used for the coupler for an air suspension according to the embodiment of the present disclosure.

Referring to FIG. 5, the rubber band 30 may be made of natural rubber or synthetic rubber or of a material made by mixing rubber with various types of additives. The present disclosure is not restricted or limited by the type and properties of the rubber band 30.

The rubber band 30 may be provided by cutting a rubber band roll (not illustrated) having a predefined length, width, and thickness into a predefined dimension (e.g., a length corresponding to the topping cord sheet) in the form of a band (e.g., a band having a length greater than a width).

The forming unit 100 may have various structures capable of forming the topping cord sheet 20 in a hollow cylindrical shape and attaching the rubber band 30 integrally to the outer circumferential surface of the topping cord sheet 20. The present disclosure is not restricted or limited by the structure of the forming unit 100.

In particular, the forming unit 100 may attach the rubber band 30 to the outer circumferential surface of the topping cord sheet 20 in a non-heated state in which no heat is applied.

Since the forming unit 100 attaches the rubber band 30 to the outer circumferential surface of the topping cord sheet 20 in the non-heated state as described above, it is possible to obtain an advantageous effect of inhibiting the rubber band 30 from abnormally swelling or separating from a required attachment position during the process of attaching the rubber band 30 to the outer circumferential surface of the topping cord sheet 20.

Figure 6:
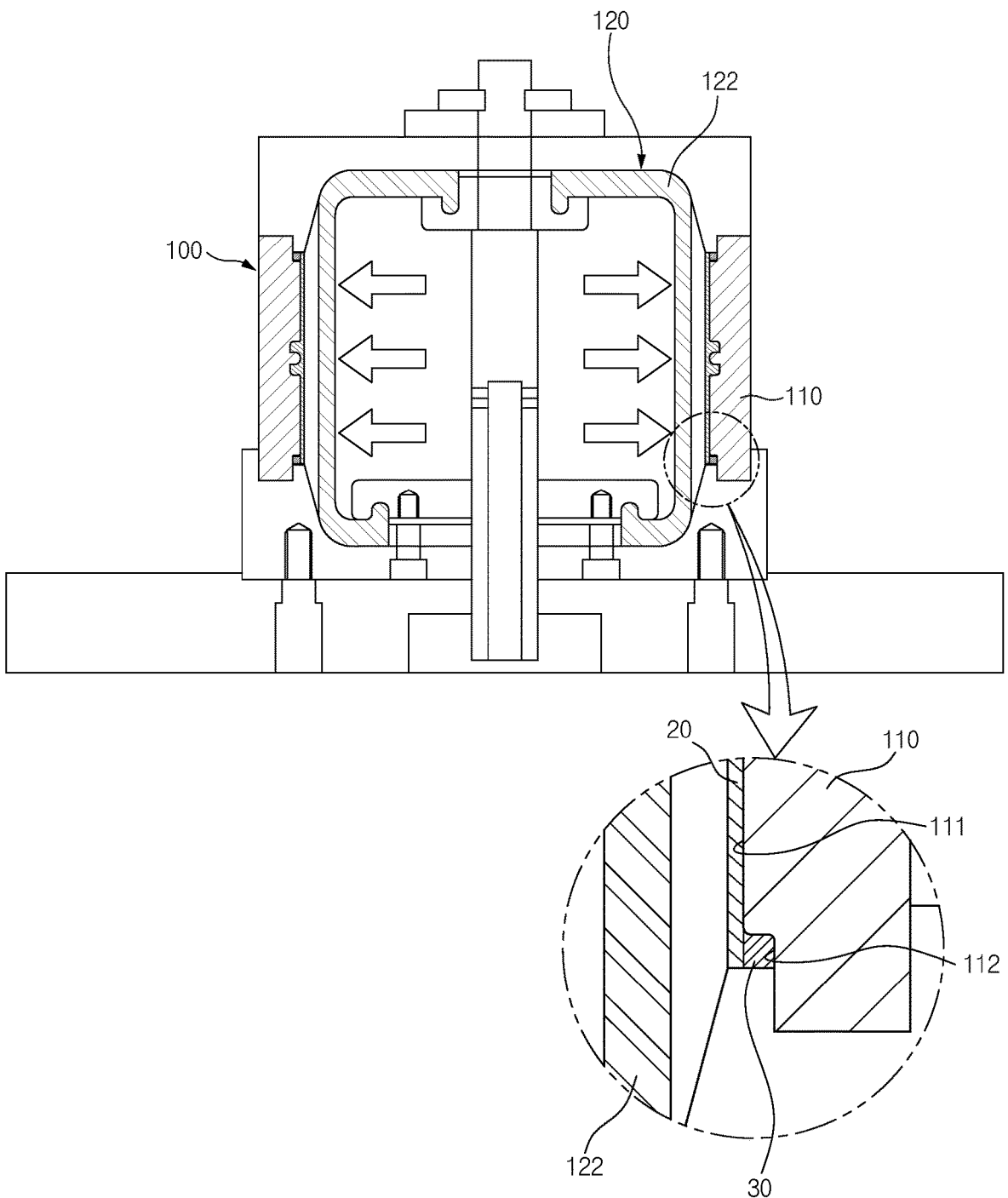
FIG. 6 is a view for explaining a forming unit of an apparatus for manufacturing the coupler for an air suspension according to the embodiment of the present disclosure.
Figure 7:
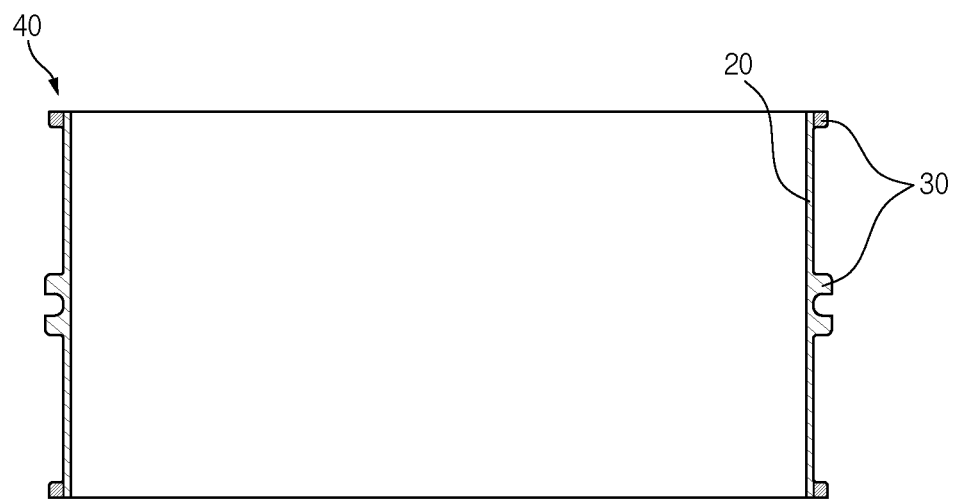
FIG. 7 is a view for explaining an intermediately formed body formed by the forming unit of the apparatus for manufacturing the coupler for an air suspension according to the embodiment of the present disclosure.

Referring to FIG. 6, according to the exemplary embodiment of the present disclosure, the forming unit 100 may include a first mold 110 having an inner surface on which the rubber band 30 and the topping cord sheet 20 are disposed, and a first pressing part 120 configured to press the topping cord sheet 20 in a direction in which an outer surface of the topping cord sheet 20 comes into close contact with an inner surface of the rubber band 30.

The first mold 110 may have various structures capable of supporting the rubber band 30 and the topping cord sheet 20. The present disclosure is not restricted or limited by the structure of the first mold 110.

For example, the first mold 110 may have a hollow cylindrical shape having a single first inner circumferential surface 111 connected continuously. The rubber band 30 may be disposed on the first inner circumferential surface 111 so as to have an approximately ring shape in a circumferential direction of the first inner circumferential surface 111.

In particular, an accommodation groove 112 may be recessed in the first inner circumferential surface 111 of the first mold 110. The rubber band 30 may be accommodated in the accommodation groove 112. More particularly, the inner surface of the rubber band 30 accommodated in the accommodation groove 112 may be disposed to have the same circumference as the first inner circumferential surface 111.

The topping cord sheet 20 may be disposed on the first inner circumferential surface 111 of the first mold 110 and cover the rubber band 30. The topping cord sheet 20 may be disposed to have an approximately ring shape in the circumferential direction of the first inner circumferential surface 111.

The first pressing part 120 may have various structures capable of pressing the outer surface of the topping cord sheet 20 against the inner surface of the rubber band 30. The present disclosure is not restricted or limited by the type and structure of the first pressing part 120.

According to the exemplary embodiment of the present disclosure, the first pressing part 120 may include a first bladder 122 configured to be expandable and contractible and press the inner circumferential surface of the topping cord sheet 20.

The first bladder 122 may be made of an elastic material that may be elastically expanded (expanded in the radial direction) and contracted by a pneumatic or hydraulic pressure. The present disclosure is not restricted or limited by the shape and structure of the first bladder 122.

For example, the first bladder 122 may have an approximately cylindrical shape and be accommodated in the first mold 110 (in the topping cord sheet) so as to be expandable and contractible in the radial direction.

As described above, according to the embodiment of the present disclosure, the first bladder 122 is used to press the inner circumferential surface of the topping cord sheet 20. Therefore, it is possible to form the topping cord sheet 20 in a hollow cylindrical shape and form the intermediately formed body 40 having the rubber band 30 integrally attached to the outer surface of the topping cord sheet 20 (see FIG. 7).

Among other things, according to the embodiment of the present disclosure, the first bladder 122 may be used to press the entire inner circumferential surface of the topping cord sheet 20, thereby applying a uniform pressing force to the entire inner surface of the topping cord sheet 20. Therefore, it is possible to obtain an advantageous effect of entirely and uniformly bringing the topping cord sheet 20 and the rubber band 30 into close contact with each other.

For reference, the outer surface of the topping cord sheet 20 may be brought into close contact with the inner surface of the rubber band 30 by applying the pressing force to the inner circumferential surface of the topping cord sheet 20. The state (the shape of the intermediately formed body) in which the rubber band 30 is attached to the outer circumferential surface of the topping cord sheet 20 may be maintained by a mutual adhesive force between the topping cord sheet 20 and the rubber band 30.

The vulcanization unit 200 is configured to vulcanize the intermediately formed body 40 made by connecting the topping cord sheet 20 and the rubber band 30.

The vulcanization unit 200 may have various structures capable of vulcanizing the intermediately formed body 40 by applying heat to the intermediately formed body 40. The present disclosure is not restricted or limited by the structure and vulcanization method of the vulcanization unit 200.

Figure 8:
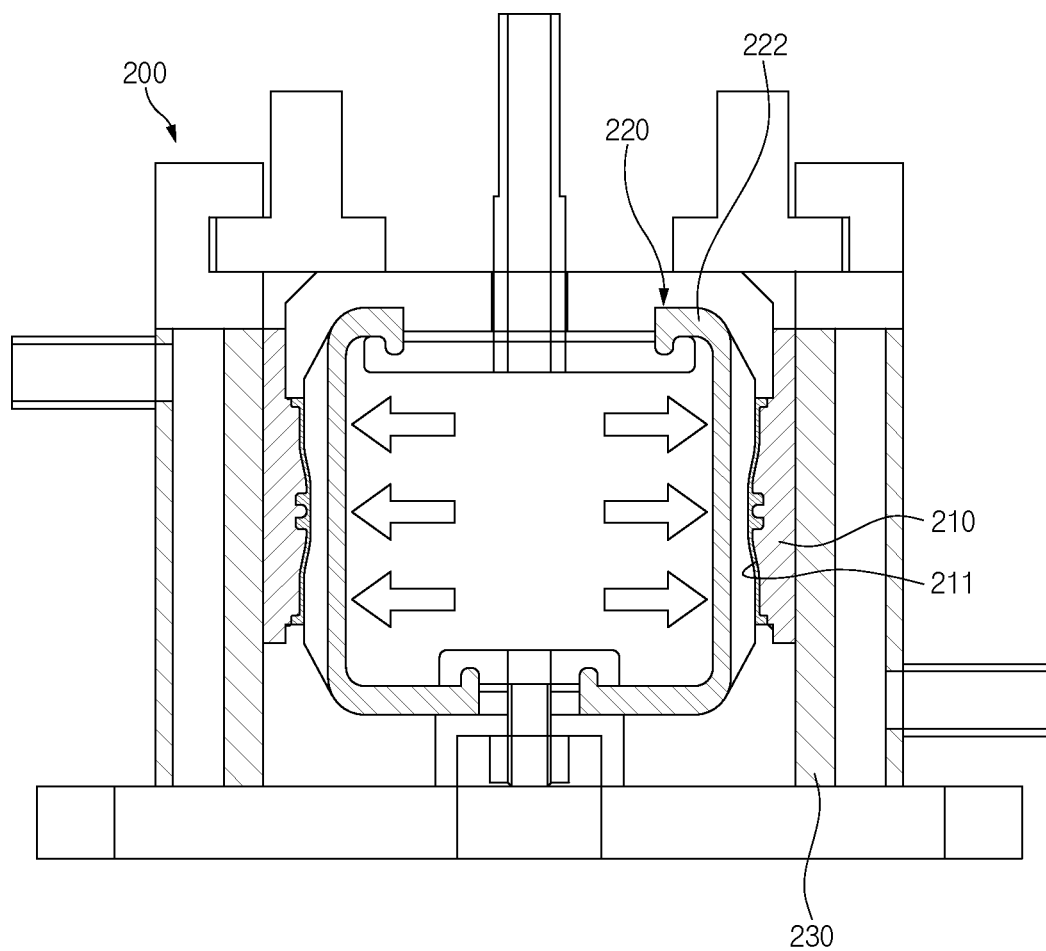
FIG. 8 is a view for explaining a vulcanization unit of the apparatus for manufacturing the coupler for an air suspension according to the embodiment of the present disclosure.

Referring to FIG. 8, according to the exemplary embodiment of the present disclosure, the vulcanization unit 200 may include: a second mold 210 having an inner surface on which the intermediately formed body 40 is disposed; a second pressing part 220 configured to press the intermediately formed body 40 against the inner surface of the second mold 210; and a heating part 230 configured to heat the second mold 210.

The second mold 210 may have various structures capable of supporting the intermediately formed body 40. The present disclosure is not restricted or limited by the structure of the second mold 210.

For example, the second mold 210 may have a hollow cylindrical shape having a single second inner circumferential surface 211 connected continuously. The intermediately formed body 40 may be coaxially disposed in the second inner circumferential surface 211.

A shape of the outer circumferential surface of the coupler 40' may be determined by the structure and shape of the second inner circumferential surface 211. The present disclosure is not restricted or limited by the structure and shape of the second inner circumferential surface 211.

For example, the second inner circumferential surface 211 may include a bent section (a protruding or recessed section) provided on an approximately central portion thereof. According to another embodiment of the present disclosure, the second inner circumferential surface may have a straight cross-sectional shape without a bent section.

The second pressing part 220 may have various structures capable of pressing the intermediately formed body 40 against the second inner circumferential surface 211 of the second mold 210. The present disclosure is not restricted or limited by the type and structure of the second pressing part 220.

According to the exemplary embodiment of the present disclosure, the second pressing part 220 may include a second bladder 222 configured to be expandable and contractible and press the inner circumferential surface of the intermediately formed body 40.

The second bladder 222 may be made of an elastic material that may be elastically expanded (expanded in the radial direction) and contracted by a pneumatic or hydraulic pressure. The present disclosure is not restricted or limited by the shape and structure of the second bladder 222.

For example, the second bladder 222 may have an approximately cylindrical shape and be accommodated in the second mold 210 (in the intermediately formed body) so as to be expandable and contractible in the radial direction.

As described above, the second bladder 222 may be used to press the inner circumferential surface of the intermediately formed body 40, thereby applying a uniform pressing force to the entire inner surface of the intermediately formed body 40. Therefore, it is possible to obtain an advantageous effect of stably maintaining the arrangement state of the intermediately formed body 40 during the process of vulcanizing the intermediately formed body 40.

The heating part 230 is configured to selectively heat the second mold 210.

The heating part 230 may have various structures capable of heating the second mold 210 to a predetermined vulcanization temperature (a temperature at which the intermediately formed body is vulcanized). The present disclosure is not restricted or limited by the structure and heating method of the heating part 230.

For example, the heating part 230 may heat the second mold 210 by supplying steam to a circumference of the second mold 210. According to another embodiment of the present disclosure, the heating part may include a heater or other heat sources configured to heat the second mold or the intermediately formed body.

As described above, according to the embodiment of the present disclosure, the intermediately formed body 40 made by connecting the topping cord sheet 20 and the rubber band 30 may be heated, such that the topping cord sheet 20 may become the coupler main body 42', and the rubber band 30 may become the ring-shaped protrusion 44' integrally connected to the coupler main body 42'.

Among other things, in the related art, a shape of a rubber sheet is deformed by forcibly pressing the rubber sheet stacked on the topping cord sheet 20 with the first mold 110 and the second mold 210 in order to form the coupler 40' having the ring-shaped protrusion 44'. However, according to the embodiment of the present disclosure, it is possible to form the coupler 40' having the ring-shaped protrusion 44' by simply vulcanizing the topping cord sheet 20 and the rubber band 30 without forcibly deforming the shape of the rubber sheet. Therefore, it is possible to obtain an advantageous effect of preventing a parting line from being formed on the outer circumferential surface of the coupler 40' during the process of manufacturing the coupler 40' and preventing the cord 24 of the topping cord sheet 20 from being pushed out or exposed to the outside.

Moreover, according to the embodiment of the present disclosure, because the ring-shaped protrusion 44' is formed by the rubber band 30, it is possible to exclude the rubber sheet from the intermediately formed body 40 used to form the coupler 40'. Therefore, it is possible to obtain an advantageous effect of simplifying the structure and manufacturing process and reducing the manufacturing costs.

Hereinafter, a method of manufacturing a coupler for an air suspension according to an embodiment of the present disclosure will be described.

Figure 2:
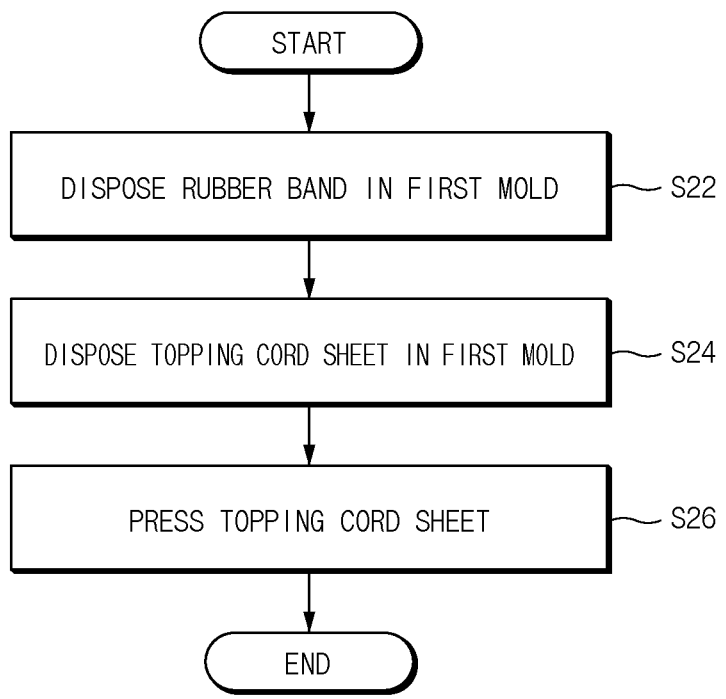
FIG. 2 is a flowchart for explaining a forming step of the method of manufacturing the coupler for an air suspension according to the embodiment of the present disclosure.
Figure 3:
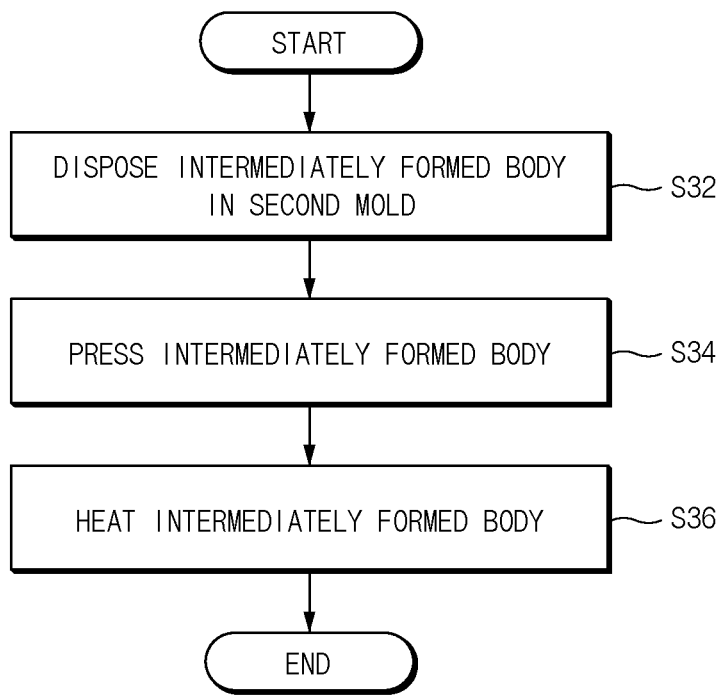
FIG. 3 is a flowchart for explaining a vulcanization step of the method of manufacturing the coupler for an air suspension according to the embodiment of the present disclosure.

FIG. 1 is a flowchart for explaining the method of manufacturing the coupler for an air suspension according to the embodiment of the present disclosure, FIG. 2 is a flowchart for explaining a forming step of the method of manufacturing the coupler for an air suspension according to the embodiment of the present disclosure, and FIG. 3 is a flowchart for explaining a vulcanization step of the method of manufacturing the coupler for an air suspension according to the embodiment of the present disclosure. Further, the parts identical and equivalent to the parts in the above-mentioned configuration will be designated by the identical or equivalent reference numerals, and detailed descriptions thereof will be omitted.

Referring to FIGS. 1 to 3, the method of manufacturing the coupler for an air suspension includes a preparation step S10 of preparing the topping cord sheet 20 and the rubber band 30, a forming step S20 of attaching the rubber band 30 to the outer circumferential surface of the topping cord sheet 20, and a vulcanization step S30 of vulcanizing the intermediately formed body 40 made by connecting the topping cord sheet 20 and the rubber band 30.

Step 1:

First, the topping cord sheet 20 and the rubber band 30 are prepared (S10).

In the preparation step S10, the topping cord sheet 20 and the rubber band 30 are individually prepared.

Referring to FIG. 4, the topping cord sheet 20 may include the cord 24, and the rubber layer 22 configured to surround the cord 24.

The cord 24 may be variously changed in type and properties in accordance with required conditions and design specifications. For example, a reinforcing material containing synthetic fibers such as rayon, nylon (polyamide), or polyester or other fibers may be used as the cord 24.

The rubber layer 22 is integrally topped on the cord 24 so as to surround the cord 24.

The rubber layer 22 may be variously changed in type and properties in accordance with required conditions and design specifications. For example, the rubber layer 22 may be made of mixed rubber (e.g., carbon master batch (CMB) or final master batch (FMB)) made by mixing natural rubber or synthetic rubber with carbon, oil, a reinforcing agent, an active agent, or the like.

The topping cord sheet 20 may be provided by cutting a topping cord sheet roll having a predefined length, width, and thickness into a predefined dimension (e.g., in the form of a rectangular sheet having a length greater than a width).

Referring to FIG. 5, the rubber band 30 may be made of natural rubber or synthetic rubber or of a material made by mixing rubber with various types of additives.

The rubber band 30 may be provided by cutting a rubber band roll having a predefined length, width, and thickness into a predefined dimension (e.g., a length corresponding to the topping cord sheet 20) in the form of a band (e.g., a band having a length greater than a width).

Step 2:

Next, the rubber band 30 is attached to the outer circumferential surface of the topping cord sheet 20 (S20).

In the forming step S20, the topping cord sheet 20 is formed in a hollow cylindrical shape, and the rubber band 30 is integrally attached to the outer circumferential surface of the topping cord sheet 20.

In particular, in the forming step S20, the rubber band 30 may be attached to the outer circumferential surface of the topping cord sheet 20 in the non-heated state.

Since the rubber band 30 is attached to the outer circumferential surface of the topping cord sheet 20 in the non-heated state as described above, it is possible to obtain an advantageous effect of inhibiting the rubber band 30 from abnormally swelling or separating from a required attachment position in the forming step S20.

The method of attaching the rubber band 30 to the outer circumferential surface of the topping cord sheet 20 in the forming step S20 may be variously changed in accordance with required conditions and design specifications.

Referring to FIG. 6, according to the exemplary embodiment of the present disclosure, the forming step S20 may include a step S22 of disposing the rubber band 30 on the inner surface of the first mold 110, a step S24 of disposing the topping cord sheet 20 on the inner surface of the first mold 110 so that the topping cord sheet 20 covers the rubber band 30, and a step S26 of pressing the topping cord sheet 20 in the direction in which the outer surface of the topping cord sheet 20 comes into close contact with the inner surface of the rubber band 30.

First, the rubber band 30 is disposed on the inner surface (inner circumferential surface) of the first mold 110 (S22).

For example, the first mold 110 may have a hollow cylindrical shape having the single first inner circumferential surface 111 connected continuously. The rubber band 30 may be disposed on the first inner circumferential surface 111 so as to have an approximately ring shape in the circumferential direction of the first inner circumferential surface 111.

In particular, the accommodation groove 112 may be recessed in the first inner circumferential surface 111 of the first mold 110. The rubber band 30 may be accommodated in the accommodation groove 112. More particularly, the inner surface of the rubber band 30 accommodated in the accommodation groove 112 may be disposed to have the same circumference as the first inner circumferential surface 111.

Next, the topping cord sheet 20 is disposed on the inner surface of the first mold 110 and covers the rubber band 30 (S24).

The topping cord sheet 20 may be disposed on the first inner circumferential surface 111 of the first mold 110 and cover the rubber band 30. The topping cord sheet 20 may be disposed to have an approximately ring shape in the circumferential direction of the first inner circumferential surface 111.

Thereafter, the topping cord sheet 20 is pressed in the direction in which the outer surface of the topping cord sheet 20 comes into close contact with the inner surface of the rubber band 30 (S26).

The method of pressing the topping cord sheet 20 against the rubber band 30 may be implemented in various ways in accordance with required conditions and design specifications.

According to the exemplary embodiment of the present disclosure, in the step S26 of pressing the topping cord sheet 20 in the direction in which the outer surface of the topping cord sheet 20 comes into close contact with the inner surface of the rubber band 30, the first bladder 122, which is expandable and contractible, may be used to press the inner circumferential surface of the topping cord sheet 20.

The first bladder 122 may be made of an elastic material that may be selectively expanded (expanded in the radial direction) and contracted by a pneumatic or hydraulic pressure. The present disclosure is not restricted or limited by the shape and structure of the first bladder 122.

For example, the first bladder 122 may have an approximately cylindrical shape and be accommodated in the first mold 110 (in the topping cord sheet 20) so as to be expandable and contractible in the radial direction.

As described above, according to the embodiment of the present disclosure, the first bladder 122 is used to press the inner circumferential surface of the topping cord sheet 20.

Therefore, it is possible to attach the rubber band 30 integrally to the outer surface of the topping cord sheet 20 while forming the topping cord sheet 20 in a hollow cylindrical shape.

Among other things, according to the embodiment of the present disclosure, the first bladder 122 may be used to press the entire inner circumferential surface of the topping cord sheet 20, thereby applying a uniform pressing force to the entire inner surface of the topping cord sheet 20. Therefore, it is possible to obtain an advantageous effect of entirely and uniformly bringing the topping cord sheet 20 and the rubber band 30 into close contact with each other.

Step 3:

Next, the intermediately formed body 40 made by connecting the topping cord sheet 20 and the rubber band 30 is vulcanized (S30).

The method of vulcanizing the intermediately formed body 40 in the vulcanization step S30 may be variously changed in accordance with required conditions and design specifications.

Referring to FIG. 8, according to the exemplary embodiment of the present disclosure, the vulcanization step S30 may include a step S32 of disposing the intermediately formed body 40 on the inner surface of the second mold 210, a step S34 of pressing the intermediately formed body 40 against the inner surface of the second mold 210, and a step S36 of heating the intermediately formed body 40.

For example, the second mold 210 may have a hollow cylindrical shape having the single second inner circumferential surface 211 connected continuously. In the step S32 of disposing the intermediately formed body 40 on the inner surface of the second mold 210, the intermediately formed body 40 may be coaxially disposed in the second inner circumferential surface 211.

The method of pressing the intermediately formed body 40 against the second inner circumferential surface 211 of the second mold 210 may be implemented in various ways in accordance with required conditions and design specifications.

According to the exemplary embodiment of the present disclosure, in the step S34 of pressing the inner circumferential surface of the intermediately formed body 40 against the inner surface of the second mold 210, the second bladder 222, which is expandable and contractible, may be used to press the inner circumferential surface of the intermediately formed body 40.

The second bladder 222 may be made of an elastic material that may be selectively expanded (expanded in the radial direction) and contracted by a pneumatic or hydraulic pressure. The present disclosure is not restricted or limited by the shape and structure of the second bladder 222.

For example, the second bladder 222 may have an approximately cylindrical shape and be accommodated in the second mold 210 (in the intermediately formed body 40) so as to be expandable and contractible in the radial direction.

As described above, the second bladder 222 may be used to press the inner circumferential surface of the intermediately formed body 40, thereby applying a uniform pressing force to the entire inner surface of the intermediately formed body 40. Therefore, it is possible to obtain an advantageous effect of stably maintaining the arrangement state of the intermediately formed body 40 during the process of vulcanizing the intermediately formed body 40.

The method of heating the intermediately formed body 40 may be implemented in various ways in accordance with required conditions and design specifications.

According to the exemplary embodiment of the present disclosure, in the step S36 of heating the intermediately formed body 40, the steam is supplied to the circumference of the second mold 210 to heat the second mold 210, such that the intermediately formed body 40 may be heated to a predetermined vulcanization temperature (a temperature at which the intermediately formed body is vulcanized).

According to another embodiment of the present disclosure, in the step of heating the intermediately formed body, the intermediately formed body may be heated by a heater or other heat sources.

When the intermediately formed body 40 is heated to a predefined vulcanization temperature, physical properties of the topping cord sheet 20 and the rubber band 30, which constitute the intermediately formed body 40, are changed, such that the intermediately formed body 40 may become an elastic body with high elasticity, and the topping cord sheet 20 and the rubber band 30 may be integrally connected as a unitary body.

Figure 9:
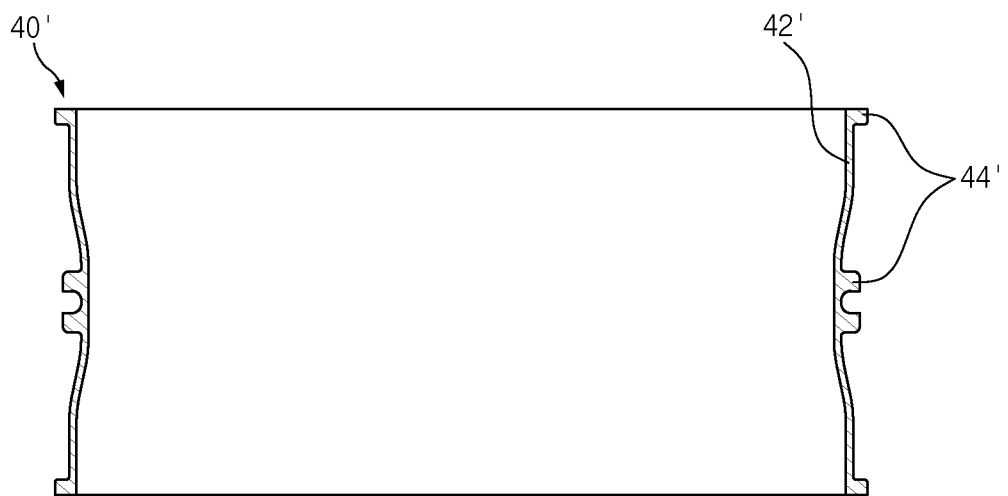
FIG. 9 is a view for explaining the coupler vulcanized by the vulcanization unit of the apparatus for manufacturing the coupler for an air suspension according to the embodiment of the present disclosure.
Figure 10:
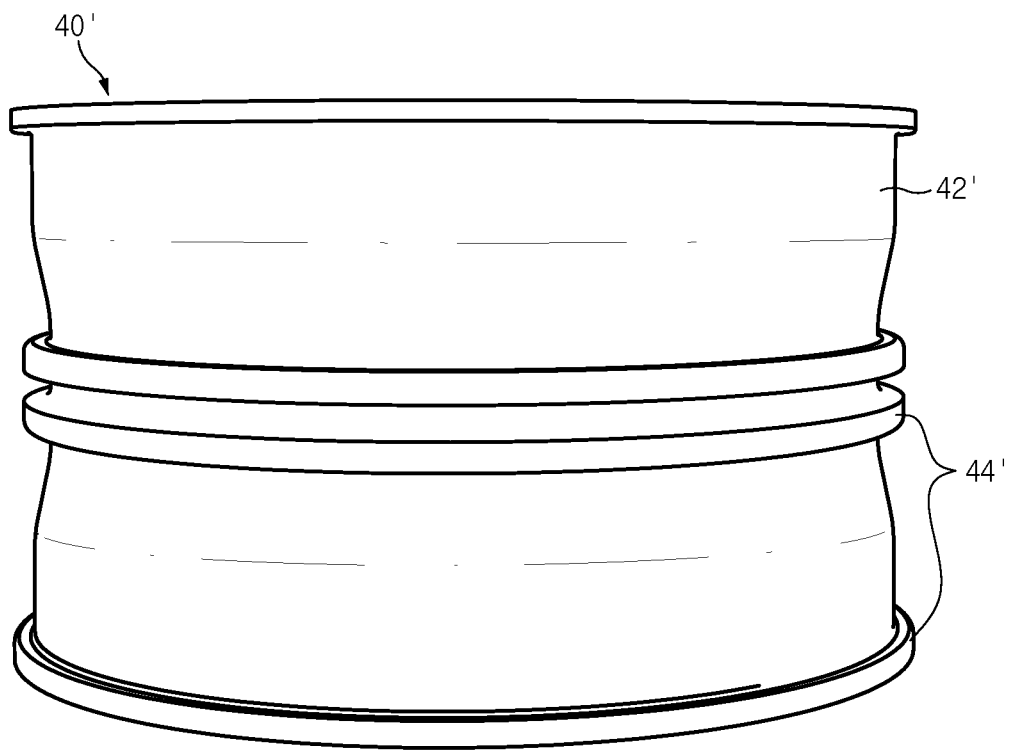
FIG. 10 is a perspective view for explaining the coupler for an air suspension according to the embodiment of the present disclosure.

Meanwhile, FIGS. 9 and 10 illustrate the coupler 40' manufactured by the method of manufacturing the coupler 40' for an air suspension according to the embodiment of the present disclosure.

Referring to FIGS. 9 and 10, the coupler 40' for an air suspension according to the embodiment of the present disclosure includes the coupler main body 42' having a hollow cylindrical shape, and the ring-shaped protrusions 44' formed on the outer circumferential surface of the coupler main body 42'.

The coupler main body 42' and the ring-shaped protrusions 44' may be made by attaching the rubber bands 30 to the outer circumferential surface of the topping cord sheet 20 and vulcanizing the intermediately formed body 40 made by connecting the topping cord sheet 20 and the rubber bands 30. More specifically, the topping cord sheet 20 may become the coupler main body 42', and the rubber band 30 may become the ring-shaped protrusion 44' integrally connected to the coupler main body 42'.

In particular, the ring-shaped protrusions 44' may be respectively disposed on the outer circumferential surfaces of one end, the other end, and the central portion of the coupler main body 42'. The arrangement state of the fixing ring coupled to the coupler main body 42' may be fixed by the ring-shaped protrusions 44'.

According to the present disclosure described above, it is possible to obtain an advantageous effect of improving the quality and durability and reducing the defect rate.

In particular, according to the embodiment of the present disclosure, it is possible to obtain an advantageous effect of inhibiting the occurrence of a parting line during the process of manufacturing the coupler for an air suspension and improving the quality and durability.

In addition, according to the embodiment of the present disclosure, it is possible to obtain an advantageous effect of simplifying the structure and manufacturing process and reducing the manufacturing costs.

In addition, according to the embodiment of the present disclosure, it is possible to obtain an advantageous effect of shortening the time required to manufacture the coupler for an air suspension and improving the production efficiency.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. An apparatus for manufacturing a coupler for an air suspension, the apparatus comprising:
a forming unit configured to connect a topping cord sheet and a rubber band to each other by attaching the rubber band to an outer circumferential surface of the topping cord sheet, the forming unit comprising a first mold having an inner surface on which the rubber band and the topping cord sheet are dispose; and
a vulcanization unit configured to vulcanize an intermediately formed body made by the connecting of the topping cord sheet and the rubber band to each other,
wherein an accommodation groove is disposed in the inner surface of the first mold and accommodates the rubber band.

2. The apparatus of claim 1, wherein the forming unit further comprises:
a pressing part configured to press the topping cord sheet in a direction in which the outer circumferential surface of the topping cord sheet comes into close contact with an inner surface of the rubber band.

3. The apparatus of claim 2, wherein the pressing part comprises a bladder configured to be expandable and contractible, and to press an inner circumferential surface of the topping cord sheet.

4. The apparatus of claim 3, wherein wherein the bladder presses the inner circumferential surface of the topping cord sheet in a state in which the topping cord sheet is disposed to cover the accommodation groove.

5. The apparatus of claim 1, wherein the vulcanization unit comprises:
a second mold having an inner surface on which the intermediately formed body is disposed;
a pressing part configured to press the intermediately formed body against the inner surface of the second mold; and
a heating part configured to heat the second mold.

6. The apparatus of claim 5, wherein the pressing part comprises a bladder configured to press an inner circumferential surface of the intermediately formed body.

7. The apparatus of claim 5, wherein the second mold has a single second inner circumferential surface connected continuously.

8. An apparatus for manufacturing a coupler for an air suspension, the apparatus comprising:
a mold having an accommodation groove disposed in an inner surface of the mold which is configured to hold a rubber band, wherein a topping cord sheet is configured to be disposed on the inner surface of the mold to cover the rubber band, and the mold is further configured to press the topping cord sheet in a direction in which an outer circumferential surface of the topping cord sheet comes into contact with an inner surface of the rubber band; and
a vulcanization unit configured to vulcanize an intermediately formed body made by the connecting the topping cord sheet and the rubber band to each other.

* * * * *